United States Patent [19]

Limburg

[11] 3,957,725

[45] May 18, 1976

[54] ACTIVE MATRIX AND INTRINSIC PHOTOCONDUCTIVE POLYMER

[75] Inventor: William W. Limburg, Penfield, N.Y.

[73] Assignee: Xerox Corporation, Stamford, Conn.

[22] Filed: Sept. 27, 1974

[21] Appl. No.: 509,774

Related U.S. Application Data

[62] Division of Ser. No. 357,987, May 7, 1973, Pat. No. 3,899,328.

[52] U.S. Cl. ............................ 260/46.5 R; 250/199; 260/46.5 E; 260/46.5 Y; 260/448.2 R; 260/448.2 N; 307/88.3; 332/7.51; 357/30
[51] Int. Cl.² ........................................ C08G 77/04
[58] Field of Search .................. 260/46.5 E, 46.5 R, 260/448.2 R, 448.2 N, 46.5 Y

[56] References Cited
UNITED STATES PATENTS

| | | | |
|---|---|---|---|
| 2,950,986 | 8/1960 | Bailey et al. | 260/46.5 R |
| 3,105,061 | 9/1963 | Bruner | 260/46.5 |
| 3,209,053 | 9/1965 | Gilkey et al. | 260/46.5 E |
| 3,391,109 | 7/1968 | Wilkus et al. | 260/46.5 Y |
| 3,741,932 | 6/1973 | Smith | 260/46.5 E |

Primary Examiner—Melvyn I. Marquis
Attorney, Agent, or Firm—John E. Crowe; James J. Ralabate; James P. O'Sullivan

[57] ABSTRACT

A process for obtaining a substantially linear homopolymer and/or copolymeric material from a cyclic trimer such as 1,3,5-trimethyl-1,3,5-tri(N-ethyl-3-carbazyl)cyclobisiloxane alone or in combination with cyclic trimers or tetramers exemplified by the formulae

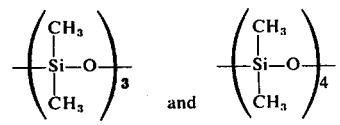

in the presence of tetramethylammonium silanolate or corresponding alkali metal salt as initiators; the polymeric product, and photoconductive members utilizing such product demonstrate excellent structural and electronic properties for xerographic purposes.

9 Claims, No Drawings

ACTIVE MATRIX AND INTRINSIC PHOTOCONDUCTIVE POLYMER

This is a division of application Ser. No. 357,987, filed May 7, 1973 now U.S. Pat. No. 3,899,328.

BACKGROUND OF THE INVENTION

In the electrophotographic or xerographic art it is customary to utilize photoreceptor plates having at least an external photoconductive insulating layer and a charge conductive supporting substrate. Generally, a photoconductive layer is uniformly electrostatically charged in the absence of light or other activating radiation and, thereafter, exposed to a light pattern which can correspond to a negative image. The areas of the photoconductive layer which are so exposed selectively lose their charge much more rapidly than non-exposed areas. As a result, the photoconductive layer at least temporarily retains a charge corresponding essentially to a latent positive image. This image can then be conveniently developed to form a visible positive image by contacting with oppositely charged pigmented particles commonly identified as toner particles which will adhere mostly to the charged areas. The resulting image may optionally be permanently affixed to the photoconductor if the imaging layer is not to be reused. This usually occurs with binder-type photoconductive films where the photoconductive imaging layer is also an integral part of the finished copy.

Where "plain paper" copying systems are involved, however, the latent image is conveniently developed on the imaging surface of a reusable photoconductor, or transferred to another surface such as a sheet of paper, and thereafter developed. After a latent image is developed on the imaging surface of a reusable-type photoconductor, it is transferred to another substrate and then permanently affixed by using any one of a variety of well-known techniques such as by overcoating with a transparent film, or by thermal fusion of the toner particles to the sheet. In such a copying system the materials in the photoconductive layer must be capable of rapidly changing from an insulative, to a charge-conductive, and then back to an insulative condition to permit cyclic use of the imaging surface. Failure to revert back to the insulative state before each succeeding charging sequence will result in a high dark decay rate commonly referred to as "fatigue". In the past, the problem has been controlled, to some extent, simply by selection of those photoconductive materials having the best known rapid switching capacity. Typical of such materials are anthracene, poly(N-vinylcarbazole), sulfur, selenium, selenium alloys, metal-free phthalocyanines, etc., and mixtures thereof (U.S. Pat. No. 2,297,691).

While organic photoconductive materials such as poly(N-vinylcarbazole) generally have good dark decay characteristics, they generally lack sufficient inherent photosensitivity to be completely competitive with selenium. For this reason, they are usually used together with "activators". Poly(vinylcarbazoles), for example, are sensitized with 2,4,7-trinitro-9-fluorenone to obtain improved photoresponse, discharge characteristics, and even some improvement in dark decay characteristics (ref. U.S. Pat. No. 3,484,237). There are also other organic resins which are traditionally considered non-photoconductive, but which can be sensitized with Lewis Acids to form charge-transfer complexes which are photoresponsive at the visible end of the spectrum. U.S. Pat. Nos. 3,408,181; 3,408,182; 3,408,183; 3,408,184; 3,408,185; 3,408,186; 3,408,187; 3,408,188; 3,408,189; and 3,408,190 are of interest in this area.

For all practical purposes, the amount of sensitization of both photoconductive and non-photoconductive resins depends upon the concentration of the activator; within limits, the higher the loading, the greater the photoresponse obtained. Unfortunately, however, loadings exceeding about 10 weight percent of the photoconductive composition will usually impair mechanical and/or photoconductive properties of the sensitized composition. Excessive amounts of activator in either a photoconductive or a nonphotoconductive material of the type disclosed in the above patents will tend to crystallize out of the photoconductive composition.

The above inherent limitations make it very difficult and often times impossible to obtain the much-desired marriage of a high quantum efficiency photoconductor with a tough, transparent, flexible, active matrix material having a low injection threshold.

One very useful discovery in this area utilizes various protective polymeric overcoats capable of holding a charge of high field strength on an external surface and also permitting selective transmittal of holes from a photoconductive layer through the polymeric overcoat.

None of the known active matrix materials, however, are capable of satisfying all of the important physical and electronic properties needed for modern xerographic or electrophotographic usage.

OBJECTS OF THE INVENTION

It is an object of the present invention to obtain a new class of polymeric materials having the necessary physical and electrical properties to permit a wider and more flexible use of xerographic principles for copying purposes.

It is a further object to synthesize and utilize a new class of intrinsic organic photoconductors which can be combined with a substantial amount of an activator without unduly affecting its mechanical or photoconductive properties.

A further object of the present invention is to discover and synthesize a new active polymeric matrix material which is compatible with high quantum efficiency photoconductor material and which retains its flexability and durability.

SUMMARY OF THE INVENTION

These and other objects are realized by the discovery, preparation and utilization of a new class of silicon-containing polymeric materials, photoreceptor components utilizing such materials as active matrices and/or intrinsic photoconductors. When used as described, the materials provide a method for obtaining increased durability, and efficiency in xerographic photoreceptors.

Compounds within the scope of the present invention are conveniently described as thermally stable, flexible, essentially linear polysiloxane material having a number average molecular weight greater than 1000, and generally falling within the range of about 1000–1,000,000.

Polymeric components of this type include homopolymers, random copolymers, and block copolymers which are conveniently represented by the general formulae

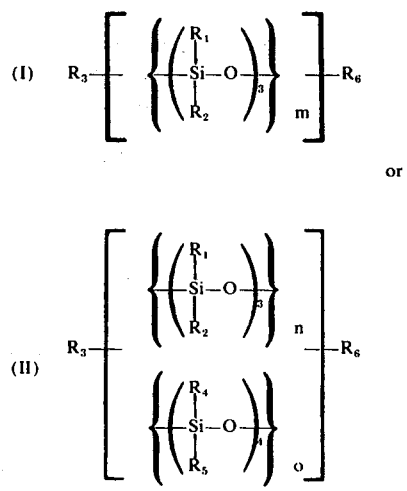

wherein $R_1$ is defined as a lower alkyl group, preferably an alkyl of 1–8 carbon atoms such as methyl, propyl, isopropyl and octyl; a lower alkoxy such as a methoxy or propoxy; and as a lower alkyl carbonyloxy group such as acetoxy;

$R_2$ is defined as an aromatic polycyclic group with fused aromatic rings having at least 3 fused ring nuclei; or defined as a heteroaromatic group. Included within such definitions are polycyclic moieties and heterocyclic moieties such as an anthracene, a perylene, a tetraphene, a pyrene, a phenanthrene, a carbazole, a benzcarbazole, an indole, a dibenzofurane, or a dibenzothiophene group, inclusive of alkyl-, halo-and cyano-substituted polycyclic and heterocyclic groups. Particularly preferred groups within this definition include

III

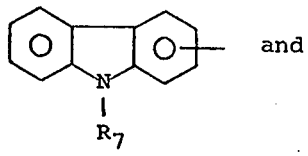 and

IV

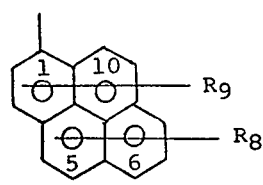

wherein $R_7$ is defined as a lower alkyl group of 2–8 carbon atoms such as ethyl, propyl, isopropyl or octyl, and defined as an aryl group such as a phenyl group or a naphthyl group;

$R_8$ and $R_9$ are individually defined as a hydrogen, lower alkyl of 1–8 carbon atoms, halo such as chloro and bromo, and cyano groups, such groups being preferably attached to one or more of the 3, 6 or 8 positions on heterocyclic ring system (III) and on one or more of the fused aromatic rings of ring system (IV);

$R_3$ of formulae I and II is defined as a polymeric end group including the residue of an initiating chain such as a tetra-methyl ammonium silanolate, or otherwise defined as a hydroxyl or ester group such as an alkyl carbonyl or an aryl carbonyl group in which the alkyl moiety usefully contains 1–18 carbon atoms and the aryl moiety is a phenyl group such as phenyl, hydroxy phenyl, an alkyl phenyl or a halo phenyl group;

$R_4$ and $R_5$ are individually defined as a lower alkyl group, including alkyl groups of 1–8 carbon atoms such as methyl propyl, isopropyl and n-octyl, and preferably as an alkyl of 1–3 carbon atoms;

$R_6$ is a polymeric end group, including hydrogen or an acyl group such as an alkyl carbonyl having an alkyl moiety of 1–18 carbon atoms and an aryl carbonyl such as a phenyl carbonyl exemplified by phenylcarbonyl, alkyl substituted phenylcarbonyl or halophenylcarbonyl; and $m$, $n$ and $o$ are positive numbers commensurate with a number average molecular weight of at least about 1000 and conveniently varying from about 1000–1,000,000 or higher, the numbers $(3)(n)$ and $(4)(o)$ being defined so as to fall within a ratio of about 3:1 to 1:8 in a random or block copolymer. For purposes of the present invention the copolymers tend to exceed the homopolymers in molecular weight, a preferred although non-exclusive range being about 1,000–50,000 for the homopolymer and about 1,000–500,000 for the copolymer, depending upon the ratio of monomeric units and the definitions of $R_1$ and $R_2$.

The above-defined homopolymers and copolymers are found to be multifunctional in nature (i.e. as an intrinsic photoconductor or as an active matrix) and are essentially linear, although desired amounts of cross linking are obtainable, merely by varying the choice of one or more of the monomeric components. Groups favoring such cross linking, for instance, include monomers whose $R_1$ radical is defined as an alkoxy, an acetoxy or similar reactive hydrolyzable group.

Suitable monomeric components and ratios thereof which are includible within the present invention are set forth in Table I below with respect to formula V.

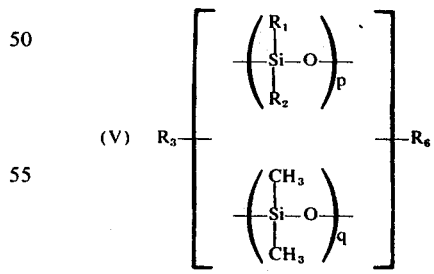

Table I

| No. | Approximate Number Average MW | $R_1$ | $R_2$ | $R_3$ | $R_6$ | Ratio p:q |
|---|---|---|---|---|---|---|
| P-1 | 1300 | CH$_3$ | (perylene) | OH | H | — |

Table I-continued

| No. | Approximate Number Average MW | R₁ | R₂ | R₃ | R₆ | Ratio p:q |
|---|---|---|---|---|---|---|
| P-2 | 10,000 | " | " | " | " | — |
| P-4 | 22,000 | " | " | " | " | 3:1 |
| P-3 | 13,000 | | 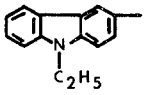 | " | — | — |
| P-5 | 50,000 | " | " | " | " | 1:1 |
| P-6 | 250,000 | " | " | " | " | 1:4 |
| P-7 | 500,000 | " | " | " | " | 1:6 |
| P-8 | 700,000 | " | " | " | " | 1:8 |
| P-9 | 1,000,000 | " | " | " | " | 1:8 |

Homopolymers or copolymers within the scope of the present invention can be conveniently synthesized from known reactants in accordance with the following general reaction mechanism in which the $R_1$ and $R_2$ radicals are defined as in formulae I–II, as follows:

(a) $R_2-Br + \phi-Li \rightarrow R_2-Li + \phi Br$;

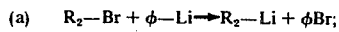

(b) $R_2-Li + Cl_3-Si-R_1 \rightarrow R_1-Si-Cl_2$;
                                                           $R_2$ (c) 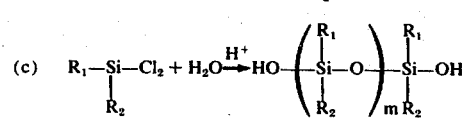

or (d) 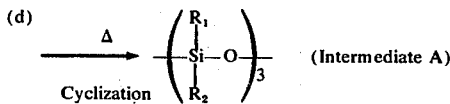 (Intermediate A)

where $R_2$ is a carbazyl group, steps (c) and (d) preferably proceed as follows:

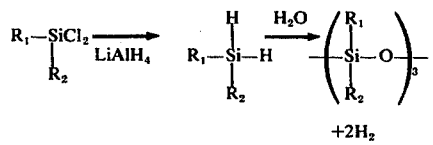

In the above partial reaction, Intermediate A preferably includes the following cyclic trimers:

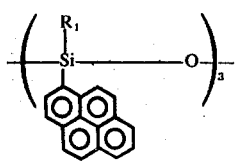

and

-continued

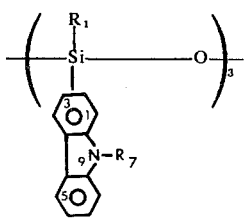

Substantially the same reaction mechanism is also found useful in obtaining cyclized tetramer or trimer reactants such as

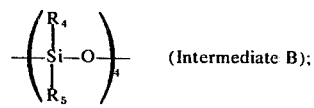 (Intermediate B);

wherein the $R_{4-5}$ and $R_7$ radicals are defined as in formulae I–IV supra.

Intermediate A (supra) can be easily converted to the desired homopolymer or to a corresponding copolymer by contacting (a) cyclic trimer or (b) a controlled combination of the cyclic trimer and a cyclic tetramer, (i.e. Intermediate B), with an initiating amount of tetra alkyl ammonium silanolate or corresponding alkali metal salt thereof such as a potassium salt (30–500 ppm); optionally the reaction can proceed in the presence of a strong base such as KOH. For this purpose, the reaction temperature can vary from about 20° to about 160°C, depending upon the optimal use of reaction solvent and the choice of reactants.

When no reaction solvent is utilized, the reaction can best proceed in the presence of tetra alkylammonium silanolate at a temperature of about 80°–160°C. Preferably this reaction is effected under vacuum for a period of about 3–5 hours. Extended reaction periods particularly at the higher temperature range, however, favors an increased randomness of units attributed to indiscriminate cleavage of long chains by initiator groups.

When polymerization is carried out in the presence of a reaction solvent such as tetrahydrofuran, toluene or dichloroethane, however, it is found most convenient to use one of the above initiators, particularly the corresponding potassium salt of a silanolate initiator

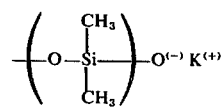

at a temperature optimally varying from about 20°–130°C, depending upon the solvent. It is also sometimes found advantageous to slowly raise the reaction temperature to a maximum of about 160°C during at least the last hour. Preparation of the copolymer, for instance, is conveniently exemplified by the following equation:

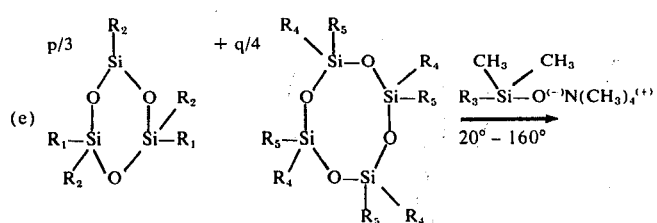

(e)

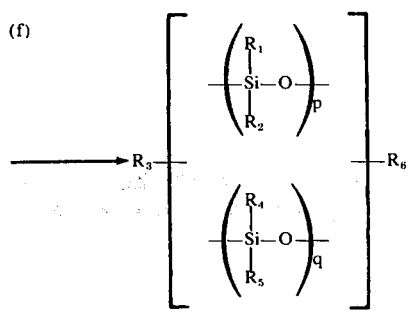

(f)

wherein $R_{1-6}$, are defined as above and the ratio of $p:q$ is about 3:1 to 1:8. While a substantial variation in the monomeric ratio is possible, it is found that polymers of a higher desirable molecular weight are obtained when both the trimer and tetramer monomers are utilized and reacted in molar amounts at least sufficient to obtain a copolymer having the indicated monomeric ratios.

For purposes of the present invention, it is also found convenient to use the cyclic trimer,

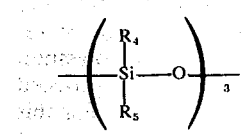

wholly or partly in place of Intermediate B.

The following examples further illustrate certain preferred embodiments of this invention.

EXAMPLE I (P—1)

0.01 Mole of a cyclic trimer of the formula

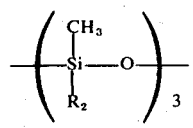

in which $R_2$ is a 1-pyrenyl group, is prepared by contacting the corresponding 1-bromopyrenyl reactant with a phenyl lithium reactant in general accordance with the mechanism described on page 9 supra. The resulting cyclic trimer intermediate is then dissolved in tetrahydrofurane and then contacted with about 150 ppm potassium tetramethyl silanolate at room temperature. The reaction mixture is heated to about 60°C for 2 hours and then slowly raised to about 120°C for an additional hour; the resulting linear homopolymer is isolated by methanol precipitation and then washed and identified as poly(methyl-1-pyrenyl siloxane). The product is soluble in $CHCl_3$, $CHCl_2CHCl_2$, cyclohexanone and tetrahydrofuran, and is conveniently cast from THF-tetrachloroethane solution to obtain a clear, hard, tough, semiflexible film. The product is tested, and the following parameters noted:

| | +corona | −corona |
|---|---|---|
| $dv/dt_{(t=o)}V_H{}^{-1}sec^{-1}$ | 90 | 6300 |
| residual (after 10 sec.) | 50 | 100 |
| potential dependence $E^n$ | 3.5 | 2.0 |
| Field v/u | 76 | 60 |

This data suggests that a substantial number of holes are injected from a selenium photoconductor layer into the polymer overcoat and discharging the negative charge on the polymer surface.

EXAMPLE II (P—2)

0.001 Mole of the trimer of Example I is admixed with an initiating amount of tetramethylammonium silanolate (150 ppm) and heated at about 150°C for 2 hours in a sealed glass ampule under vacuum. The resulting pyrenyl group-containing siloxane homopolymer is coded as P—2. The vacuum stripped, tested and washed product is evaluated in Tables II–III below.

EXAMPLE III (P—3)

0.01 Mole of cyclic trimer of the formula

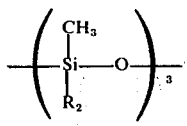

in which $R_2$ is the N-ethyl carbazole group prepared from monobrominated N-ethyl carbazole according to the reaction mechanism of Example I; the cyclic monomer reactant is dissolved in THF and then contacted with tetramethyl ammonium silanolate (150 ppm) dissolved in toluene. After reacting at 60°C for about 2 hours, with agitation, the temperature of the reaction mixture is gradually raised to 120°C for about 1 hour. The resulting linear homopolymer is washed with methanol and identified as poly(methyl-N-ethyl-3-carbazyl siloxane). The product is evaluated in Tables II–III below.

EXAMPLE IV (P—4)

0.01 Mole of cyclized dimethyl siloxane tetramer of the formula

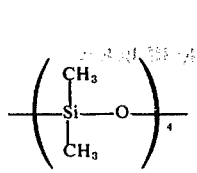

and 0.04 mole of the trimer of Example I are dissolved in tetrahydrofurane and agitated with about 150 ppm of potassium tetramethyl silanolate at 60°C for 3 hours. The temperature of the thickened reaction mixture is then raised to about 130°C for three additional hours. The resulting polymeric product (P–4) is washed and identified as an essentially random linear copolymer which is conveniently represented by the formula

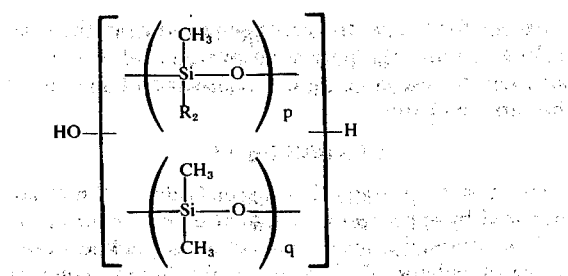

wherein the ratio of $p$-to-$q$ is about 3 to 1 and $R_2$ is 1-pyrenyl. The product is tested and results reported in Tables II–III below.

EXAMPLE V (P–5)

0.05 Mole of cyclized dimethyl siloxne tetramer of the formula

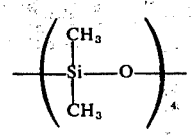

and 0.07 Mole of the cyclic trimer of Example III are dissolved in tetrahydrofuran and reacted as in Example IV. The resulting polymeric product is washed and identified as an essentially linear copolymer which is conveniently represented by the formula

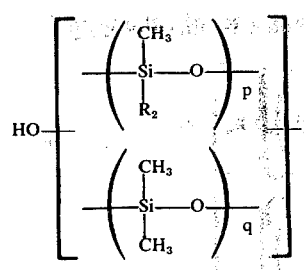

wherein $p$ and $q$ are in a ratio of about 1-to-1 and $R_2$ is defined as N-ethyl-3-carbazyl group. The product is evaluated and reported in Tables II–III.

EXAMPLE VI (P–6)

0.003 Mole of the cyclic tetramer and 0.001 Mole of the cyclic trimer of Example V are admixed with 150 ppm of tetramethylammonium silanolate and heated at about 160°C for 2 hours in a sealed glass ampule under vacuum. The resulting copolymer coded as P–6 is washed with methanol and identified as linear poly(-methyl-N-ethyl-3-carbazyl-siloxy)dimethylsiloxane copolymer represented by the formula

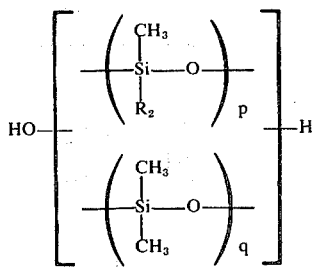

wherein $R_2$ is identified as the N-ethyl-3-carbazyl group, and $p$ and $q$ are in a ratio of about 1:4. The methanol-washed product is tested and evaluated in Tables II–III.

EXAMPLE VII (P–7)

0.01 Mole of the cyclic trimer and 0.05 Mole of the cyclic tetramer of Example V are dissolved in tetrahydrofuran and agitated in the presence of about 150 ppm potassium dimethyl silanolate initiator at about 120°C. After 3 hours the reaction temperature is gradually raised to about 160°C for 1 hour to obtain an essentially linear copolymer conveniently represented by the formula

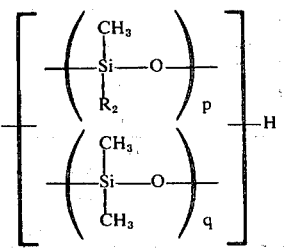

wherein $R_2$ is N-ethyl-3-carbazyl group, and $p$ and $q$ are in a ratio of about 1:6. The methanol-washed product is repeated in Table I.

EXAMPLE VIII (P–8)

Example VII is repeated with the addition of .001 mole of a second cyclic trimer of the formula

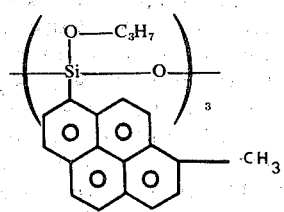

to obtain a copolymer identified as P–8. The product is methanol-washed and reported in Table I.

EXAMPLE IX (P—9)

Example VII is repeated except that the trimer reactant is a cyclic compound of the formula

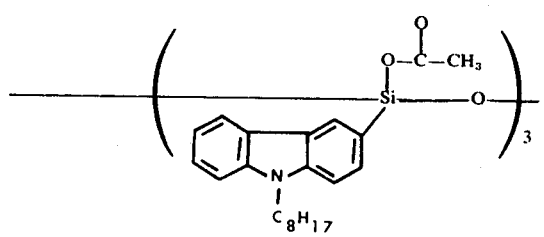

The resulting copolymeric product is methanol-washed and reported in Table I.

Table II

| Code | Polymer | Hardness ** | Flexibility ** | Clarity ** |
|---|---|---|---|---|
| P-1 | H* | — | — | — |
| P-2 | H | vg. | g. | ex. |
| P-3 | H* | vg. | g. | vg. |
| P-4 | C* | ex. | vg. | g. |
| P-5 | C | vg. | ex. | g. |
| P-6 | C | vg. | ex. | g. |

\* H - homopolymer  
C - copolymer

\*\* p - poor  
f - fair  
g - good  
vg - very good  
ex - excellent

EXAMPLE X

Six test photoreceptor strips identified as T 1–5 and as "control" are prepared in the usual manner by vapor condensation of selenium alloy (60 $\mu$) onto an aluminum foil substrate. A polymeric overcoat is then cast onto the resulting selenium photoconductive layer from tetrachloroethane-tetrahydrofurane solutions of products P 2–6 respectively, to obtain polymeric overcoats having an average thickness of about 12 $\mu$. The resulting test components are then corona charged, checked for charge retention and discharged by exposure for 10 seconds with a 200 watt tungsten-iodine lamp at a distance of 15 centimeters. The control test is prepared by applying onto the selenium alloy a homopolymer resin overcoat having a molecular weight of about 500,000 consisting of monomeric units of the formula

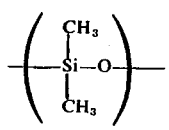

The results are reported in Table III below.

TABLE III

| Test | Polymer | (+) Corona | Res. Volt. (10 Sec) Light | Dark Decay (+) | (—) Corona | Res. Volt. (10 Sec) Light | Dark Decay (—) |
|---|---|---|---|---|---|---|---|
| T-1 | P-2 | 90 | 50 | 12.5% | 6300 | 100 | 20% |
| T-2 | P-3 | 90 | 40 | 8 % | 6300 | 85 | 15% |
| T-3 | P-4 | 90 | 25 | 6 % | 6300 | 95 | 9% |
| T-4 | P-5 | 90 | 30 | 8 % | 6300 | 92 | 10% |
| T-5 | P-6 | 90 | 40 | 5 % | 6300 | 105 | 6% |
| Control | C-1 | 90 | 88 | 2 % | 6300 | 6200 | 1.6% |

Except for the control, holes injected from the selenium layer into the polymeric overcoat of T 1–5 are sufficient to discharge a functionally useful amount of the surface charge.

EXAMPLE XI

Two test strips identified respectively as T 6–9 are prepared by applying onto aluminized mylar substrate, a photoconductive layer of about 14 $\mu$ thickness consisting of polymer P—2 (samples T 6–7) and polymer P—6 (samples T 8–9). Surface charges are applied to each sample in the usual way and the initial rate of discharge noted when continuously exposed to white light from a 200 watt Tungsten iodine lamp at a distance of 15 centimeters. The test strips are tested as to discharge rate and for flex. The results are reported in Table IV below.

Table IV

| Sample | Polymer | Charge | Discharge Rate vu$^{-1}$ sec$^{-1}$ | Adhesion & Spalling |
|---|---|---|---|---|
| T-6 | P-2 | +90 | 82 | Passed |
| T-7 | P-2 | —6300 | 32 | " |
| T-8 | P-6 | +90 | 85 | " |
| T-9 | P-6 | —6300 | 50 | " |
| Control | C-1 | +90 | 10 | " |
| Control | C-1 | —6300 | 2 | " |

While the invention has been particularly shown and described with reference to preferred embodiments thereof, it will be understood that variations in form may be made thereon without departing from the spirit and scope of the invention.

What is claimed is:

1. A polysiloxane represented by the formulae

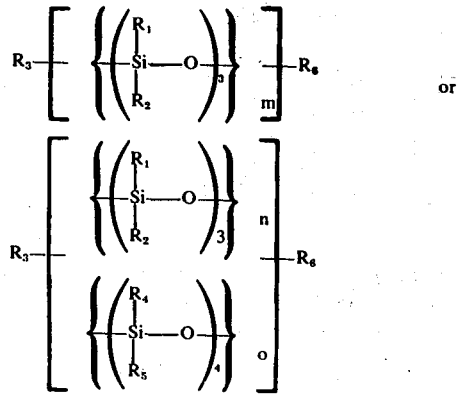

wherein $R_1$ is defined as a lower alkyl, a lower alkoxy, or lower alkyl carbonyloxy group;

$R_2$ is defined as a monovalent aromatic polycyclic radical having four fused ring nuclei or a member selected from the group consisting of a perylene, carbazole, benzcarbazole, indole, dibenzofuran or dibenzothiophene group;

$R_3$ is defined as a polymeric end group;

$R_4$ and $R_5$ are individually defined as a lower alkyl group;

$R_6$ is defined as a polymeric end group; and $m$, $n$ and $o$ are positive numbers commensurate with a molecular weight of at least 1000, the products (3) ($n$) and (4) ($o$) having a numerical ratio of about 3:1 to 1:8.

2. A polysiloxane of claim 1 wherein $R_1$, $R_4$ and $R_5$ are individually defined as an alkyl group of 1–3 carbon atoms; and $R_2$ is a radical of the formula

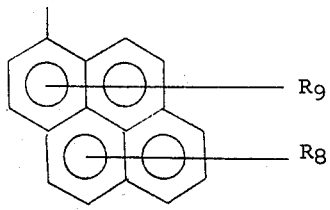

wherein $R_8$ and $R_9$ are individually defined as a hydrogen, lower alkyl, halo or cyano group, such groups being attached at one or more of the fused aromatic rings.

3. A linear copolymer of claim 1 wherein
$R_1$, $R_4$ and $R_5$ are methyl; and
$R_2$ is 1-pyrenyl.

4. A polysiloxane of claim 1 wherein
$R_1$, $R_4$ and $R_5$ are individually defined as an alkyl group of 1–3 carbon atoms; and
$R_2$ is a benzocarbazole group;

5. A linear copolymer of claim 4 wherein
$R_1$, $R_4$ and $R_5$ are methyl and
$R_2$ is N-propyl-3-carbazole.

6. A linear copolymer of claim 4 wherein
$R_1$, $R_4$ and $R_5$ are methyl, and
$R_2$ is N-octyl-3-carbazole.

7. A linear copolymer of claim 4 wherein
$R_1$, $R_4$ and $R_5$ are methyl; and
$R_2$ is N-ethyl-3-carbazole.

8. A linear polysiloxane represented by the formula

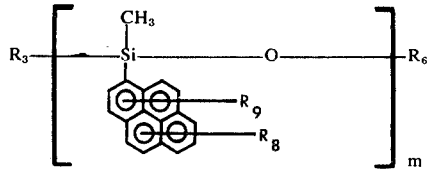

wherein $m$ is a positive number commensurate with a number average molecular weight of at least about 1,000;

$R_3$ and $R_6$ are polymeric end groups; and $R_8$ and $R_9$ are individually defined as a hydrogen, lower alkyl, halo or cyano group.

9. A linear polysiloxane represented by the formula

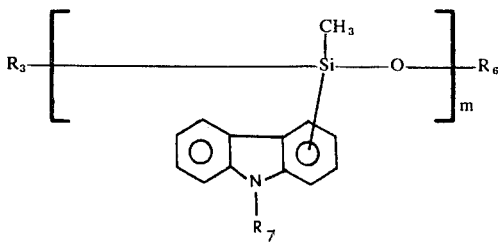

wherein $m$ is a positive number commensurate with a number average molecular weight of at least about 1,000;

$R_3$ and $R_6$ are polymeric end groups; and $R_7$ is an alkyl group of 2–8 carbon atoms or an aryl group.

* * * * *

UNITED STATES PATENT AND TRADEMARK OFFICE
CERTIFICATE OF CORRECTION

PATENT NO. : 3,957,725
DATED : May 18, 1976
INVENTOR(S) : William W. Limburg

It is certified that error appears in the above-identified patent and that said Letters Patent are hereby corrected as shown below:

Column 8, lines 62 and 63, delete "poly(methyl-N-ethyl-3-carbazyl siloxane)" and insert --poly(methyl-N-ethyl-3-carbazyl)siloxane--.

Column 9, line 34, delete "siloxne" and insert --siloxane--.

Signed and Sealed this

Ninth Day of November 1976

[SEAL]

Attest:

RUTH C. MASON
Attesting Officer

C. MARSHALL DANN
Commissioner of Patents and Trademarks